Figure 1:
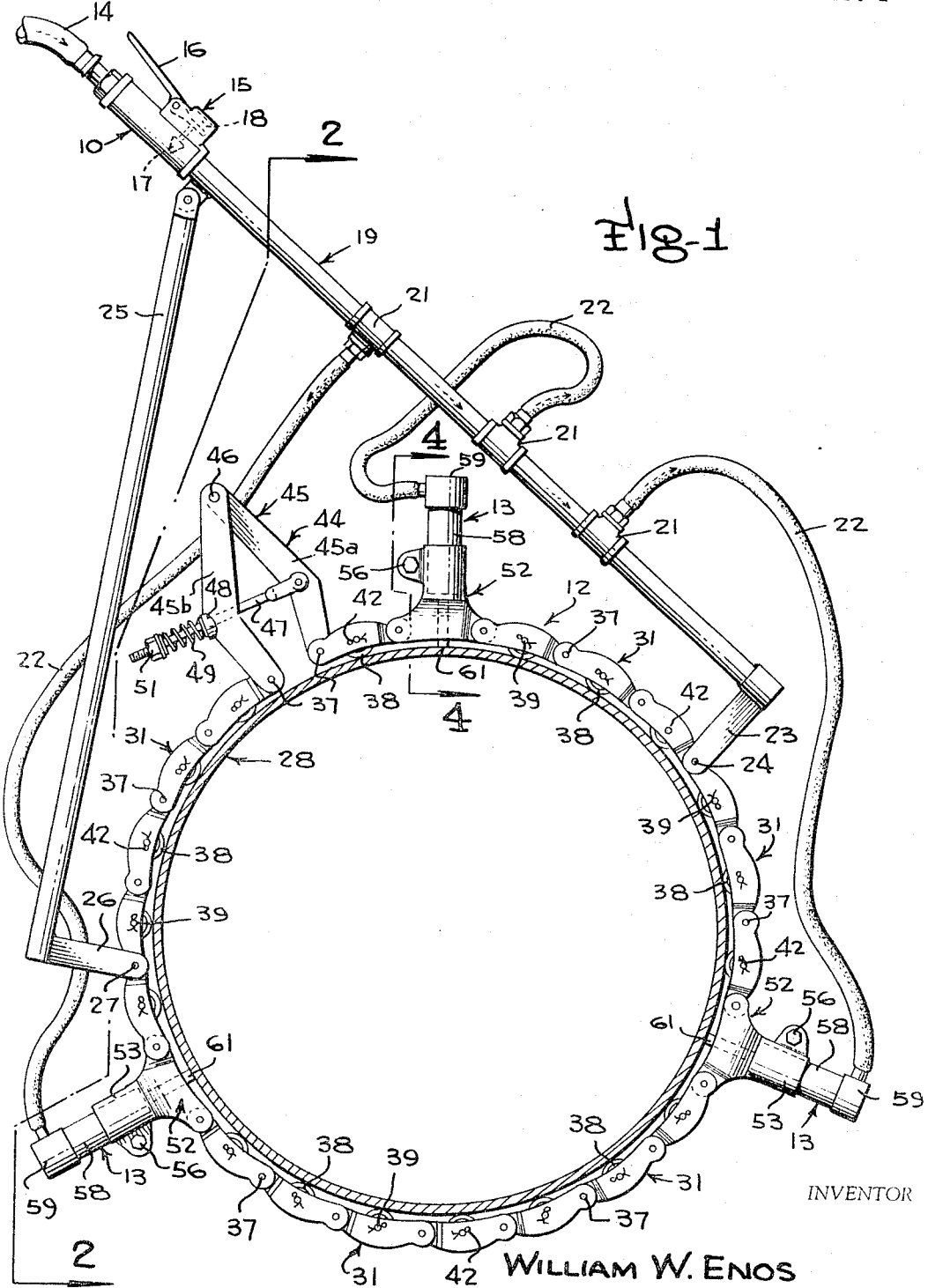

March 14, 1967  W. W. ENOS  3,309,002
PIPE CUTTING MACHINE
Filed March 24, 1965  2 Sheets-Sheet 1

INVENTOR
WILLIAM W. ENOS
BY Mason, Fenwick & Lawrence
ATTORNEYS

March 14, 1967 W. W. ENOS 3,309,002
PIPE CUTTING MACHINE
Filed March 24, 1965 2 Sheets-Sheet 2
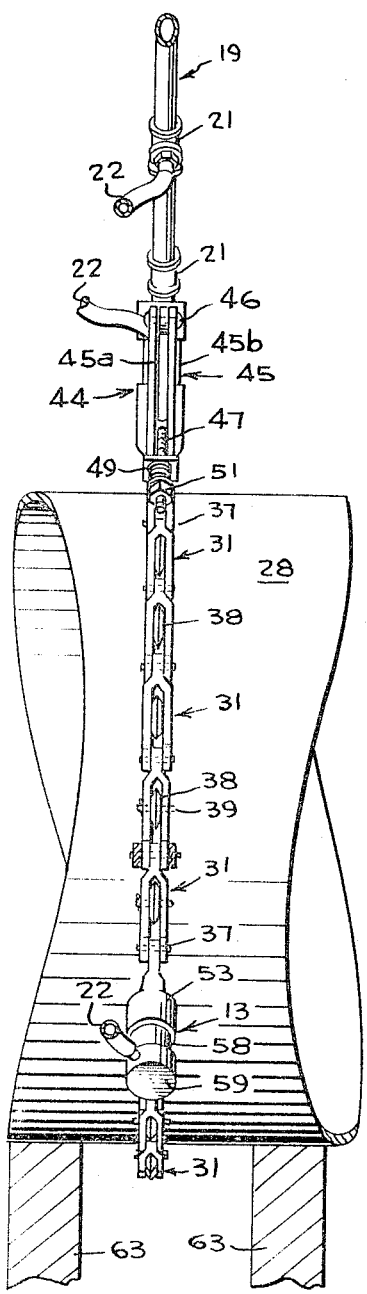
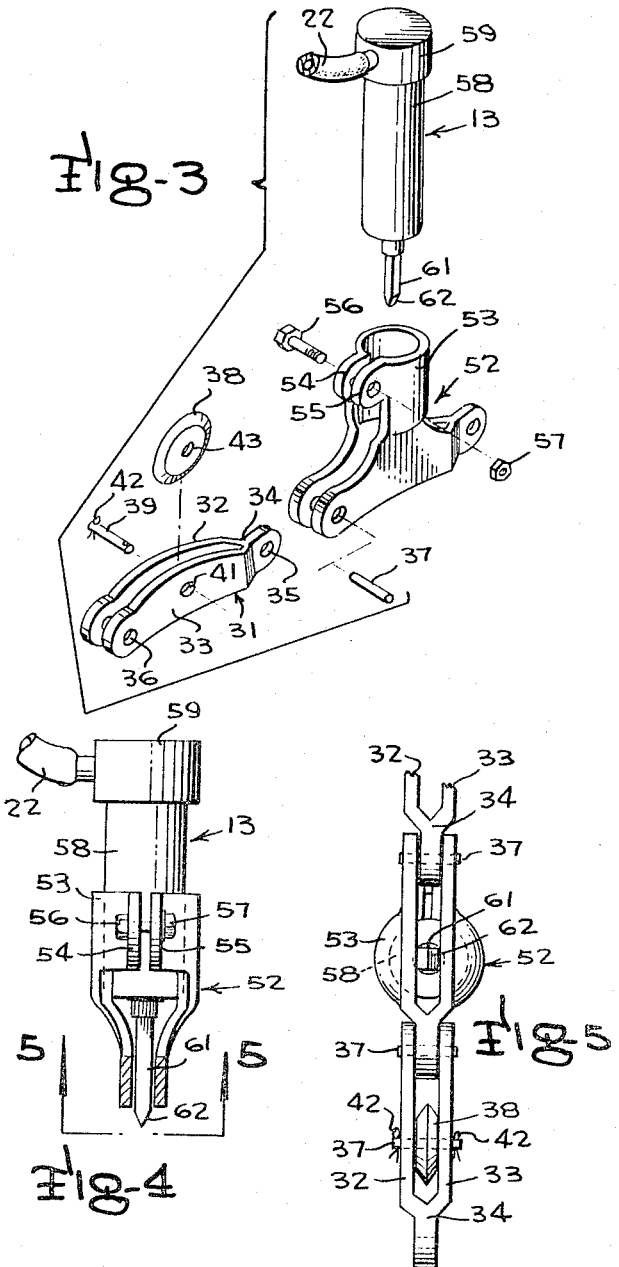
INVENTOR
WILLIAM W. ENOS
BY Mason, Fenwick & Lawrence
ATTORNEYS

United States Patent Office 3,309,002
Patented Mar. 14, 1967

3,309,002
PIPE CUTTING MACHINE
William W. Enos, 536 Blount Point Road, Newport News, Va. 23606
Filed Mar. 24, 1965, Ser. No. 442,331
9 Claims. (Cl. 225—2)

This invention relates in general to pipe cutters, and more particularly to an improved pipe cutter for cutting cast iron pipe or other pipe of hard, brittle material such as vitreous clay, concrete, or cement asbestos.

Up to the present time, the cutting of relatively brittle hollow articles, notably cast iron pipe and the like, frequently has been a difficult and time consuming operation. Cast iron pipe is known to be an extremely difficult article in which a smooth cut may be easily obtained. The machines of the prior art have been noticeable in their inability to cut cast iron pipe having a diameter larger than 12 to 15 inches.

The machines in use at this time for cutting pipe of less than the aforementioned sizes generally include a chain-type cutter in which a linked chain is passed around the pipe and then by hydraulic pressure drawn tightly therearound. These chains normally have cutting wheels which make a score line about the pipe as the chain is manually revolved. However, it is obvious from this type of cutting device that the provision of a hydraulically tightened chain will make it virtually impossible to rotate the chain about the pipe of a large diameter. In addition, this type of cutter tends to break the pipe about the score line thereby resulting in a ragged cut.

In the pipe cutters designed for cast iron pipe larger than 18 inches in diameter, there is known to be a lathe type cutter which must be assembled around the pipe in an open trench and then carefully adjusted and centered. These machines are made in several sizes with each machine having only a limited range of pipe sizes, therefore, a pipe crew must have several of these machines to be able to cut through the various sizes of pipe encountered, which results in a rather impractical situation. A second type of large diameter pipe cutting machine is one embodying a saw type milling cutter, which is held in place and powered by a chain around the pipe. This machine is very slow and often as the pipe is being cut, it is under strain. At times the uncut portion of the pipe will break along an improper line necessitating a second cut to be made.

Therefore, an object of this invention is the provision of an improved pipe cutting machine for removing a section of pipe from a continuous length of the pipe by means of pneumatically driven chisels.

Another object of this invention is the provision of an improved pipe cutting machine which, when readily assembled about the circumference of a continuous length of the pipe in an open trench, cuts the pipe by means of a pneumatically driven chisel as the machine is rotated about the pipe.

A still further object of this invention is the provision of an improved pipe cutter which cleaves a pipe along a score line by means of one or more chisels driven by pneumatic hammers secured by a linked chain. The links of the chain have sharp edged wheels which are pulled to the pipe with sufficient pressure to hold the machine to the pipe and allow the wheels to fall into the score line made by the chisels and thus guiding the entire chain thereby causing the chisels to move in a desired path as the cutting machine is oscillated around the pipe.

Yet another object of this invention is the provision of a pipe cutting machine which is intended for cleaving cast iron pipe of large diameter equally as well as pipe of smaller diameter.

Other objects, advantages, and capabilities of the invention will become apparent from the following description taken in conjunction with the accompanying drawing showing only a preferred embodiment of the invention.

In the drawings:
FIGURE 1 is a side elevation view of the pipe cutting machine of the present invention affixed about a section of pipe;
FIGURE 2 is a vertical section of the invention taken along lines 2—2 of FIGURE 1;
FIGURE 3 is an exploded perspective view of the pneumatic cutting tool bracket assembly and one chain link of the invention;
FIGURE 4 is a vertical section view taken along lines 4—4 of FIGURE 1 showing the pneumatic cutting tool partially in elevation and partially in section; and
FIGURE 5 is a view taken along lines 5—5 of FIGURE 4 showing generally a bottom view of the pneumatic cutting tool.

Referring to the drawings wherein like reference characters designate corresponding parts throughout the several figures, the pipe cutter of the present invention comprises generally a handle 10, an air supply system 11, a chain mechanism 12, and a plurality of pneumatic hammers 13.

The handle 10 receives in its posterior end an air supply line 14 which is in communication with a suitable air compressor (not shown). The handle 10 has affixed to it an air flow control throttle, a throttle handle 16, and an air valve 17 which projects into the handle 10 and, in a normal manner, the valve 17 controls the flow of compressed air through the handle 10. The air valve 17 is operated by depressing the throttle handle 16 thereby raising the valve 17 and allowing air to pass. When it is desired to stop the flow of air, handle 16 is released thereby allowing compression spring 18 to force the air valve 17 into its closed seating arrangement.

Attached at the anterior end of the handle 10 is the main air supply line system 11 which comprises a supply pipe 19 having a plurality of spaced T fittings 21 to supply compressed air to the pneumatic hammers 13. The T fittings 21 are spaced along the supply pipe 19 at convenient points and have extending therefrom an air hose 22 which interconnects the T fittings with the pneumatic hammers. The free end of the supply pipe 19 has extending at right angles thereto a handle connector 23 which connects the supply pipe 19 to the chain mechanism 12 by means of a handle connector link pin 24. The end of the supply pipe 19 which is connected to the handle 10 has affixed thereto a handle brace 25 having at its remote free end a handle brace connector 26 which interconnects the handle brace 25 and chain mechanism 12 by means of a handle brace connector link pin 27. The connection points at which handle connector 23 and handle brace connector 26 are affixed to the chain may be at any convenient points along the chain mechanism 12. However, the normal manner in which the connectors 23, 26 would be affixed to the chain mechanism 12 would be to link them to the chain so that each connector would be on generally opposed sides of the pipe 28. This mounting arrangement would result in a large angular distance between supply pipe 19 and handle brace 25 in order to effect proper operation as will later be described.

The chain mechanism 12 is composed of a plurality of chain links 31 whose general configuration is of parallel side members 32, 33 connected at one end by a yoke 34 which terminates in a rounded head having link pin apertures 35. At the opposite end of the chain link 31 the parallel sides 32, 33 each terminate in a rounded head wherein each rounded head portion has a chain link aperture 36. The chain link apertures 36 are aligned with one another so that a link pin 37 may be inserted therethrough and through the link pin apertures 35 of an adjacent chain link to form the completed chain mechanism 12. Each chain link 31 has mounted in its mid-portion between the parallel sides 32, 33 a guide wheel 38 rotatably mounted upon axle 39. Axle 39 is held in operative position with the axle apertures 41 by means of cotter pins 42. The guide wheels 38 are rotatively mounted upon axles 39 by means of the apertured bearing surface 43.

When the chain mechanism 12 is at a desired length to fit about the circumference of the pipe 28, it is left one or more chain links short so that a tightening device 44 may be inserted. The tightening device is inserted in the same manner as any of the chain links 31 by means of a link pin 37. The tightening device 44 generally comprises a scissors clamp 45 being pivotally interconnected at one end by pivot pin 46 and having the remote free ends each connected to a free end of the linked chains by link pins 37. Attached pivotally to scissors arm 45a is a draw rod 47 which passes beside the scissors arm 45b and through the attached apertured bearing 48 connected to the last mentioned arm 45b. A compression spring 49 is placed about the draw rod 47 between the bearing 48 and a tightening nut 51. Tightening nut 51 is threaded upon the free end of draw rod 47 and tightened against the spring 49 which puts the latter in compression. This action tends to compress the scissors clamp 45 and move the mid point of arms 45a, 45b inwardly towards one another to draw the entire chain mechanism 12 tightly about the pipe 28. Because of the compression features of spring 49, chain mechanism 12 is always maintained in a tightly fitting relationship about the pipe since the arms 45a, 45b are constantly being urged inwardly.

The pneumatic hammers 13 are spaced evenly about the circumference of the pipe 28 and inserted in the chain mechanism 12 in an equal angularly spaced relationship. The hammers 13 are maintained in the chain mechanism 12 by means of a hammer bracket 52 having a configuration at its bottom portion substantially that of a chain link 31 so that it may be inserted in the chain mechanism in a rapid manner and without disturbing the geometric pattern of the mechanism 12. The upper clamping portion 53 of the bracket 52 has a configuration of a cylinder having a pair of apertured projecting tabs 54, 55 through which a clamp bolt 56 projects so that upon the tightening of a clamp bolt nut 57 the effective diameter of the upper portion 53 may be reduced. The hammers 13 are adapted to be received within the upper portion 53 and clamped therein in a manner just described.

Each of the pneumatic hammers 13 has a pneumatic air body 58, an air receiving header 59 and an elongated downwardly projecting chisel 61 which terminates in a point 62. The pneumatic hammers 13 are adjusted within the upper portion 53 of the brackets 52 in such a manner that the chisel point 62 will always contact the pipe 28 before it reaches the limit of its downward travel.

In operation of the invention the selected portions of the pipe to be cleaved will be cleared of any dirt and debris about its circumference and then the chain mechanism 12 would be placed about the circumference. It is anticipated that the pipe 28 might be supported upon supports 63 on either side of the area to be cut. Once chain mechanism 12 has been placed in proper position, the tightening device would then be operated by tightening the nut 51 to draw together the scissors clamp 45. The pressure placed upon the scissors clamp 45 should be sufficient to keep the chain mechanism 12 tightly engaged about the circumference of pipe 28. However, in no event should the tightening be such as to prevent the rotation of the chain mechanism about the pipe. Once this operation is completed, the resulting hook-up should be substantially that as shown in FIGURE 1. To cut the pipe 28, it is merely necessary to depress handle 16 of the throttle 15 thereby allowing compressed air to enter supply pipe 19 and be distributed to the pneumatic hammers 13 through the air hoses 22. The pneumatic hammers 13 will then operate in a normal manner providing a series of rapid impulses to the chisels 61 which impact in a series of sharp blows upon the pipe 28. As the operator is depressing the handle 16 he would at the same time rotate the handle 10 through the plane which passes through the chain mechanism 12 thereby causing the supply pipe 19 and handle brace 25 to move the chain mechanism about the circumference of the pipe. This movement causes the chisels 61 to strike different portions of the pipe and to inscribe thereon a score line which will eventually deepen itself a sufficient degree to cut through the pipe.

The pneumatic hammers 13 are kept within the desired score line by action of the guide wheels 38 travelling in the score line and preventing displacement of the cutting chisels 61. It should be obvious that the number of pneumatic hammers 13 may be varied by any desired number. However, it has been found that three hammers are generally sufficient and, by this provision of three hammers, the operator needs to rotate the chain mechanism in each direction only ⅓ of the circumference of the pipe to interconnect the score line of each of the hammers.

In pipes of extremely large diameter it may be necessary to have more than three hammers to reduce the arc necessary to which the handle 10 is to be rotated. The present pipe cutting apparatus has been shown to be of great advantage especially in cutting pipes of large diameter and it does this job efficiently and quickly with a very neat cut resulting on the severed ends of the pipe.

While I have particularly shown and described one particular embodiment of the invention, it is distinctly understood that the invention is not limited thereto but that modifications may be made within the scope of the invention and such variations as are covered by the scope of the appended claims.

What is claimed is:

1. Apparatus for cleaving an elongated fracturable member comprising, a handle means, a compressed air supply system affixed to one end of the handle means, a compressed air distribution system affixed to the other end of the handle means, means for regulating the flow of compressed air through the handle means into the air distribution system, a flexible non-extensible chain mechanism adapted to be placed in close juxtaposition about the circumference of the fracturable member, means for tightening the chain mechanism about the fracturable member, pneumatic cleaving means mounted in the chain mechanism for cleaving the fracturable member at predetermined times, means for interconnecting the handle means to the chain mechanism, the air distribution system being in communication with the pneumatic cleaving means, whereby when compressed air is supplied to the pneumatic cleaving means said cleaving means is adapted to separate portions of the fracturable member.

2. Apparatus for cleaving an elongated fracturable member comprising, a handle means, a compressed air supply system affixed to one end of the handle means, a compressed air distribution system affixed to the other end of the handle means, means for regulating the flow of compressed air through the handle means into the air distribution system, a flexible non-extensible chain mechanism, adapted to be placed in close juxtaposition about the circumference of the fracturable member, means for tightening the chain mechanism about the fracturable member, a plurality of individual brackets mounted atop selected portions of the chain mechanism, a pneumatic cleaving means projecting through the brackets and comprising a body member, a cutting means adapted to reciprocate partially within and partially without the body member, a cutting surface on the external portion of the cutting means adapted to strike the fracturable member at predetermined times, means for interconnecting the handle means to the chain mechanism, the air distribution system being in communication with the pneumatic cleaving means, whereby when compressed air is supplied to the pneumatic cleaving means said cleaving means is adapted to separate portions of the fracturable member.

3. Apparatus for cleaving an elongated fracturable member comprising, a handle means, a compressed air supply system affixed to one end of the handle means, a compressed air distribution system affixed to the other end of the handle means, means for regulating the flow of compressed air through the handle means into the air distribution system including an air flow control throttle on the handle means having valve means to admit compressed air to the distribution system, a flexible non extensible chain mechanism adapted to be placed in close juxtaposition about the circumference of the fracturable member, means for tightening the chain mechanism about the fracturable member, a plurality of individual brackets mounted atop selected portions of the chain mechanism, a pneumatic cleaving means projecting through the brackets and comprising a body member, a cutting means adapted to reciprocate partially within and partially without the body member, a cutting surface on the external portion of the cutting means adapted to strike the fracturable member at predetermined times, means for interconnecting the handle means to the chain mechanism, the air distribution system being in communication with the pneumatic cleaving means, whereby when compressed air is supplied to the pneumatic cleaving means said cleaving means is adapted to separate portions of the fracturable member.

4. Apparatus for cleaving an elongated fracturable member comprising, a handle means, a compressed air supply system affixed to one end of the handle means, a compressed air distribution system affixed to the other end of the handle means, means for regulating the flow of compressed air through the handle means into the air distribution system including an air flow control throttle mounted on the handle means having valve means to admit compressed air to the distribution system, a flexible non-extensible chain mechanism adapted to be placed in close juxtaposition about the circumference of the fracturable member, the chain mechanism comprising a series of chain links interconnected in an end-to-end relation, roller guide means rotatably mounted with a plurality of the chain links, the chain mechanism having an interrupted area, means for tightening the chain mechanism about the fracturable member, the tightening means comprising a scissors clamp having a pair of arms pivotally interconnected at one end thereof, the other ends of the arms being connected to the chain mechanism at the interrupted area, a plurality of individual brackets mounted atop selected portions of the chain mechanism, a pneumatic cleaving means projecting through the brackets and comprising a body member, a cutting means adapted to reciprocate partially within and partially without the body member, a cutting surface on the external portion of the cutting means adapted to strike the fracturable member at predetermined times, means for interconnecting the handle means to the chain mechanism, the air distribution system being in communication with the pneumatic cleaving means, whereby when compressed air is supplied to the pneumatic cleaving means said cleaving means is adapted to separate portions of the fracturable member.

5. Apparatus for cleaving a fracturable member comprising, a flexible support having adjustably mounted therein a plurality of pneumatic hammers, means for securing the flexible support around the fracturable member with the pneumatic hammers extending perpendicularly to the fracturable member, a reciprocable chisel carried by each of the pneumatic hammers and so positioned as to strike the fracturable member at predetermined times, means for rotating the flexible support member about the fracturable member and means supplying compressed air to the pneumatic hammers to cause the chisels to reciprocate thereby striking and cleaving the fracturable member.

6. A method of cleaving a fracturable member comprising, mounting a flexible support about the member, securing pneumatic hammers to the flexible member, providing reciprocal chisels to the pneumatic hammers perpendicularly to the fracturable member, reciprocating the chisels in the pneumatic hammers by supplied compressed air thereby causing the chisels to impact upon the fracturable member, rotating the flexible support about the fracturable member causing the reciprocating chisels to inscribe a score line about the fracturable member, and maintaining the rotation of the flexible member until the fracturable member is cleaved.

7. Apparatus for cleaving an elongated fracturable member comprising, a handle means, a compressed air supply system affixed to one end of the handle means, a compressed air distribution system affixed to the other end of the handle means, means for regulating the flow of compressed air through the handle means into the air distribution system including the air flow control throttle mounted on the handle means having valve means to admit the compressed air to the distribution system, a flexible non-extensible chain mechanism adapted to be placed in close juxtaposition about the circumference of the fracturable member, means for tightening the chain mechanism about the fracturable member, pneumatic cleaving means mounted in the chain mechanism for cleaving the fracturable member at predetermined times, means for interconnecting the handle means to the chain mechanism, the air distribution system being in communication with the pneumatic cleaving means, whereby when compressed air is supplied to the pneumatic cleaving means said cleaving means is adapted to separate portions of the fracturable member.

8. Apparatus for cleaving an elongated fracturable member comprising, a handle means, a compressed air supply system affixed to one end of the handle means, a compressed air distribution system affixed to the other end of the handle means, means for regulating the flow of compressed air through the handle means into the air distribution system, a flexible non-extensible chain mechanism adapted to be placed in close juxtaposition about the circumference of the fracturable member, the chain mechanism comprising a series of chain links interconnected in an end-to-end relation, roller guide means rotatably mounted with a plurality of the chain links, the chain mechanism having an interrupted area, means for tightening the chain mechanism about the fracturable member, pneumatic cleaving means mounted in the chain mechanism for cleaving the fracturable member at predetermined times, means for interconnecting the handle means to the chain mechanism, the air distribution system being in communication with the pneumatic cleaving means, whereby when the compressed air is supplied to the pneumatic cleaving means said cleaving means is adapted to separate portions of the fracturable member.

9. Apparatus for cleaving an elongated fracturable member comprising, a handle means, a compressed air supply system affixed to one end of the handle means, a compressed air distribution system affixed to the other end of the handle means, means for regulating the flow of compressed air through the handle means into the air distribution system, a flexible non-extensible chain mechanism adapted to be placed in close juxtaposition about the circumference of the fracturable member, the chain mechanism comprising a series of chain links interconnected in an end-to-end relation, roller guide means rotatably mounted with a plurality of the chain links, the chain mechanism having an interrupted area, means for tightening the chain mechanism about the fracturable member, the tightening means comprising a scissors clamp having a pair of arms pivotally interconnected at one end thereof, the other ends of the arms being connected to the chain mechanism at the interrupted area, pneumatic cleaving means mounted in the chain mechanism for cleaving the fracturable member at predetermined times, means for interconnecting the handle means to the chain mechanism, the air distribution system being in communication with the pneumatic cleaving means, whereby when compressed air is supplied to the pneumatic cleaving means said cleaving means is adapted to separate portions of the fracturable member.

References Cited by the Examiner

UNITED STATES PATENTS

| 2,851,773 | 9/1958 | Jennison | 225—103 X |
| 3,244,339 | 5/1966 | Carner | 225—104 |

WILLIAM W. DYER, Jr., *Primary Examiner.*

JAMES M. MEISTER, *Examiner.*